United States Patent
Xie (10) Patent No.: US 10,843,977 B2
(45) Date of Patent: *Nov. 24, 2020

(54) METHOD AND APPARATUS FOR FORMING ENGINEERED STONE

(71) Applicant: Alex Xie, West Windsor, NJ (US)

(72) Inventor: Alex Xie, West Windsor, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/398,518

(22) Filed: Apr. 30, 2019

(65) Prior Publication Data

US 2019/0256430 A1    Aug. 22, 2019

Related U.S. Application Data (60) Continuation of application No. 15/225,520, filed on Aug. 1, 2016, now Pat. No. 10,358,390, which is a
(Continued)

(51) Int. Cl.
| | |
|---|---|
| *C04B 41/60* | (2006.01) |
| *B29C 43/00* | (2006.01) |
| *B01F 9/10* | (2006.01) |
| *B01F 9/12* | (2006.01) |
| *B01F 9/20* | (2006.01) |

(Continued)

(52) U.S. Cl.
CPC .............. *C04B 41/60* (2013.01); *B01F 9/103* (2013.01); *B01F 9/125* (2013.01); *B01F 9/20* (2013.01); *B01F 15/0267* (2013.01); *B01F 15/0268* (2013.01); *B28B 3/08* (2013.01); *B28B 3/12* (2013.01); *B28C 5/32* (2013.01); *B28C 7/16* (2013.01); *B29C 43/006* (2013.01);

*B28B 1/005* (2013.01); *B29C 67/242* (2013.01); *B29L 2007/002* (2013.01)

(58) Field of Classification Search
CPC ................................. B28B 1/008; C04B 41/60
See application file for complete search history.

(56) References Cited

U.S. PATENT DOCUMENTS

| | | | |
|---|---|---|---|
| 2,556,486 A | 6/1951 | Smith | |
| 3,255,024 A | 6/1966 | Alexander | |

(Continued)

FOREIGN PATENT DOCUMENTS

| | | | |
|---|---|---|---|
| JP | S52 17250 A | 2/1977 | |
| JP | S53 96566 A | 8/1978 | |

(Continued)

*Primary Examiner* — Galen H Hauth
(74) *Attorney, Agent, or Firm* — Walter J. Tencza, Jr.

(57) ABSTRACT

A compression device, means for controlling the compression device, a drum having an inner chamber, means for rotating the drum, and first and second delivery devices for delivering first and second materials into the inner chamber of the drum while the drum is rotating. The compression device compresses the first and second material in the inner chamber of the drum while the drum is rotating about the center of the drum in response to the means for controlling the compression device. The apparatus may include a stirring device; and a means for controlling the stirring device; wherein the stirring device is configured with respect to the drum so that the stirring device can be moved up and down to a desired depth within the drum and rotates within the inner chamber of the drum to stir the first and second materials in the drum while the drum is rotating.

12 Claims, 7 Drawing Sheets

Related U.S. Application Data division of application No. 15/059,034, filed on Mar. 2, 2016, now Pat. No. 9,427,896.

(51) Int. Cl.

| | |
|---|---|
| *B01F 15/02* | (2006.01) |
| *B28C 7/16* | (2006.01) |
| *B28C 5/32* | (2006.01) |
| *B28B 3/08* | (2006.01) |
| *B28B 3/12* | (2006.01) |
| *B29L 7/00* | (2006.01) |
| *B28B 1/00* | (2006.01) |
| *B29C 67/24* | (2006.01) |

(56) References Cited

U.S. PATENT DOCUMENTS

| | | |
|---|---|---|
| 5,419,633 A | 5/1995 | Lorenzetti |
| 5,664,305 A | 9/1997 | Lawton |
| 7,935,281 B2 * | 5/2011 | Sung ............ B28B 1/004 264/245 |
| 7,959,991 B1 * | 6/2011 | West ............ B44F 9/04 428/15 |
| 8,333,916 B2 | 12/2012 | Jamrussamee |
| 9,427,896 B1 | 8/2016 | Xie |
| 9,707,698 B1 * | 7/2017 | Xie ............ B29C 43/145 |
| 2002/0081388 A1 | 6/2002 | Batliner et al. |
| 2003/0033040 A1 | 2/2003 | Billings |
| 2006/0193693 A1 | 8/2006 | Congdon |
| 2008/0113123 A1 | 5/2008 | Izzo |
| 2009/0105391 A1 | 4/2009 | Buskila et al. |
| 2015/0209984 A1 * | 7/2015 | Benito Lopez ...... E04C 2/02 428/220 |

FOREIGN PATENT DOCUMENTS

| | | |
|---|---|---|
| JP | H05 82507 U | 11/1993 |
| SU | 625935 A1 | 8/1978 |
| WO | WO 2010/097727 A2 | 9/2010 |

* cited by examiner

METHOD AND APPARATUS FOR FORMING ENGINEERED STONE

CROSS REFERENCE TO RELATED APPLICATION(S)

The present application is a continuation of and claims the priority of U.S. patent application Ser. No. 15/225,520, titled "METHOD AND APPARATUS FOR FORMING ENGINEERED STONE", filed on Aug. 1, 2016, which is a divisional of and claims the priority of U.S. patent application Ser. No. 15/059,034, titled "METHOD AND APPARATUS FOR FORMING ENGINEERED STONE", filed on Mar. 2, 2016, which has issued as U.S. Pat. No. 9,427,896, issue date Aug. 30, 2016; and the present application claims the priority of both Ser. Nos. 15/225,520 and 15/059,034.

FIELD OF THE INVENTION

This invention relates to improved methods and apparatus concerning forming engineered stone.

BACKGROUND OF THE INVENTION

Quartz is the second most abundant mineral in the Earth's crust and is one of the hardest naturally occurring materials. One application is in the formation of "engineered stone", a composite material made of particulate material such as stone, quartz, glass, shells or silicon mixed with polymer resins, dyes, binders, etc. or any combination of such. The particulate material(s) and polymer resins, binders, colorants, dyes, etc. may be poured into a supporting mold, tray or other supporting structure. The mold or tray containing the mixture is then moved into a vacuum press machine to compress the material. The compressed material is then placed into a curing machine to be heated into a hardened quartz slab. After curing, the slab is generally moved to a grinder to be grinded down to a desired thickness, followed by a polisher to finish the product.

Engineered stone, including quartz, has become a common surfacing and countertop choice throughout the world. Applications include kitchen and bath countertops, tables and desktops, floor tile, food service areas, wall cladding, and various other horizontal and vertical applications. Quartz based engineered stone has many advantages over natural stone such as marble and granite; it is harder, more durable and less water absorbent than natural stone, and is more resistant to staining, scratching, heat and chemicals. One main disadvantage to engineered stone is its lack of random color patterns and veining found in natural stone.

SUMMARY OF THE INVENTION

One or more embodiments of the present invention address a method, apparatus, and system of producing a quartz based slab with color patterns and veining similar to natural stone. In at least one embodiment, a composite material is mixed which may include or may consist of particulate stone, quartz, glass, shells or silicon mixed with polymer resins, dyes, binders, hardeners, initiators or combination of such. This damp composite material is fed into a blending drum through one of multiple feeder channels. Each channel feeds a different composite material into the blending drum. The composite material can vary based on a number of factors such as particle size or dyes used. The blending drum is a cylindrical container with open top and an exit hole in the center of the bottom (can be located at any point on the bottom). Prior to feeding composite material into the drum, a cylindrical plug is lowered over the exit hole in order to prevent material from leaking out during the following process. The blending drum rotates while the channel moves along the radius of the drum depositing material. A multiple pronged stirring apparatus is lowered and rotates as material is being deposited, resulting in an even layer of material in the drum. Based on the desired design aesthetic, multiple layers of different or alternating composite material can be added to the drum in this fashion from different feeder channels.

In at least one embodiment, a conical frustum apparatus is used to compress the layered composite material. The conical frustum is aligned such that the surface of the conical frustum apparatus is perpendicular to the axis of rotation of the drum. The inner and outer diameter of the conical frustum apparatus is specified based on the radius of the drum and each ends distance away from the axis of rotation. This allows for there to be no slip between the conical frustum and the composite material at any point of contact. In addition, the length of the apparatus is set so that the inner and outer ends of the conical frustum are specified distances away from the inner and outer ends of the drum. The pressure that the apparatus exerts on the composite material can be driven by a variety of mechanisms (hydraulically, mechanically, electrically, etc), and the pressure can by adjusted. As the drum rotates, the friction between the composite material and the conical frustum apparatus causes the conical frustum to rotate along its axis. The stirring apparatus is then lowered into the drum at a specified distance away from the drums axis of rotation. It is lowered into the composite material and rotates at a specified speed in order to blend the compressed material. The rotational speed of the stirring apparatus determines to what degree the layers of composite material are blended. This is used to determine the degree and size of marbleization in the final product. This action blends the layers of different composite material, creating random marbleization. In order to maintain this specific marbleized configuration within the composite material the composite material is compressed again by the conical frustum. After this process is complete, the plug is lifted and the marbleized material is pushed through the exit hole in the center of the drum and is placed in a mold for further processing.

In an alternate embodiment, a power hammer apparatus can be used in place of the conical frustum. The power hammer apparatus raises and lowers as the blending drum rotates in order to compress the composite material.

In at least one embodiment, an apparatus is provided comprising a compression device, means for controlling the compression device, a drum having an inner chamber, means for rotating the drum, and a first delivery device for delivering a first material into the inner chamber of the drum while the drum is rotating about a center of the drum. The compression device may be configured with respect to the drum so that the compression device compresses the first material in the inner chamber of the drum while the drum is rotating about the center of the drum in response to the means for controlling the compression device. The means for controlling the compression device may include a computer processor, computer memory, computer display, and computer interactive device, such as a computer mouse and/or keyboard for allowing control of the compression device by a user and/or by a computer.

The apparatus may further include a stirring device, and a means for controlling the stirring device. The stirring device may be configured with respect to the drum so that the stirring device can be moved up and down to a desired depth within the drum and rotates within the inner chamber of the drum to stir the first material in the inner chamber of the drum while the drum is rotating about the center of the drum in response to the means for controlling the stirring device. The means for controlling the stirring device may include a computer processor, computer memory, computer display, and computer interactive device, such as a computer mouse and/or keyboard for allowing control of the stirring device by a user and/or by a computer.

The compression device may include a conical frustum having a flat lateral outer surface connected to an axle. The conical frustum may rotate about its axis on the axle and may compress the first material in the inner chamber of the drum while the drum is rotating about the center of the drum in response to the means for controlling the compression device.

The apparatus may further include a support structure which is configured to lower the conical frustum into the inner chamber of the drum in order to compress the first material. The support structure may include a first piston connected to first end of the axle and a second piston connected to a second end of the axle. The first piston and the second piston may be controlled in order to lower the conical frustum into the inner chamber of the drum in order to compress the first material. The first and second pistons may be controlled by means such as a computer processor, computer memory, computer display, and computer interactive device, such as a computer mouse and/or keyboard, for allowing control of the first and second piston by a user and/or by a computer.

The apparatus may be further comprised of a means for controlling the first piston and second piston to control how much pressure is applied by the lateral outer surface of the conical frustum on the first material to compress the first material in the inner chamber of the drum. The conical frustum may have a circular upper base and a circular lower base, wherein the circular upper base has a smaller diameter than the circular lower base. The conical frustum may have a circumferential surface; and the conical frustum may be arranged with respect to the center of the drum so that the circular upper base is closer to the center of the drum than the circular lower base; and the circumferential surface of the conical frustum is parallel to the axis of rotation of the drum. The conical frustum may be designed so that the ratio between any cross sectional circumference of the conical frustum taken along its length and its corresponding circular travel path along the drum is constant.

In at least one embodiment, the compression device may include a power hammer device. The power hammer device may include a piston. The piston may be connected to a fan shaped compression plate. The power hammer device may include means for controlling the pounding force of the power hammer device in order to compress the first material. The means for controlling the pounding force of the power hammer device and/or the power hammer device in general may include a computer processor, computer memory, computer display, and computer interactive device, such as a computer mouse and/or keyboard for allowing control of the power hammer device by a user and/or computer.

The apparatus, in at least one embodiment may include a second delivery device for delivering a second material into the inner chamber of the drum while the drum is rotating about the center of the drum. The compression device may be configured with respect to the drum so that the compression device compresses the first and the second material together in the inner chamber of the drum while the drum is rotating about the center of the drum in response to the means for controlling the compression device.

In at least one embodiment a method is provided including layering different or alternating types of composite material in an inner chamber of an open top compartment to form a layered composite material, compressing the layered composite material in the inner chamber of the open top compartment to form a layered compressed composite material, stirring the layered compressed composite material in the inner chamber of the open top compartment in order to break the layered compressed composite material into different sized fragments and develop a marbleized pattern forming a fragmented composite marbleized material, and compressing the fragmented composite marbleized material in order to further reinforce the marbleized pattern within the fragmented composite marbleized material.

DETAILED DESCRIPTION OF THE DRAWINGS

Figure 1:
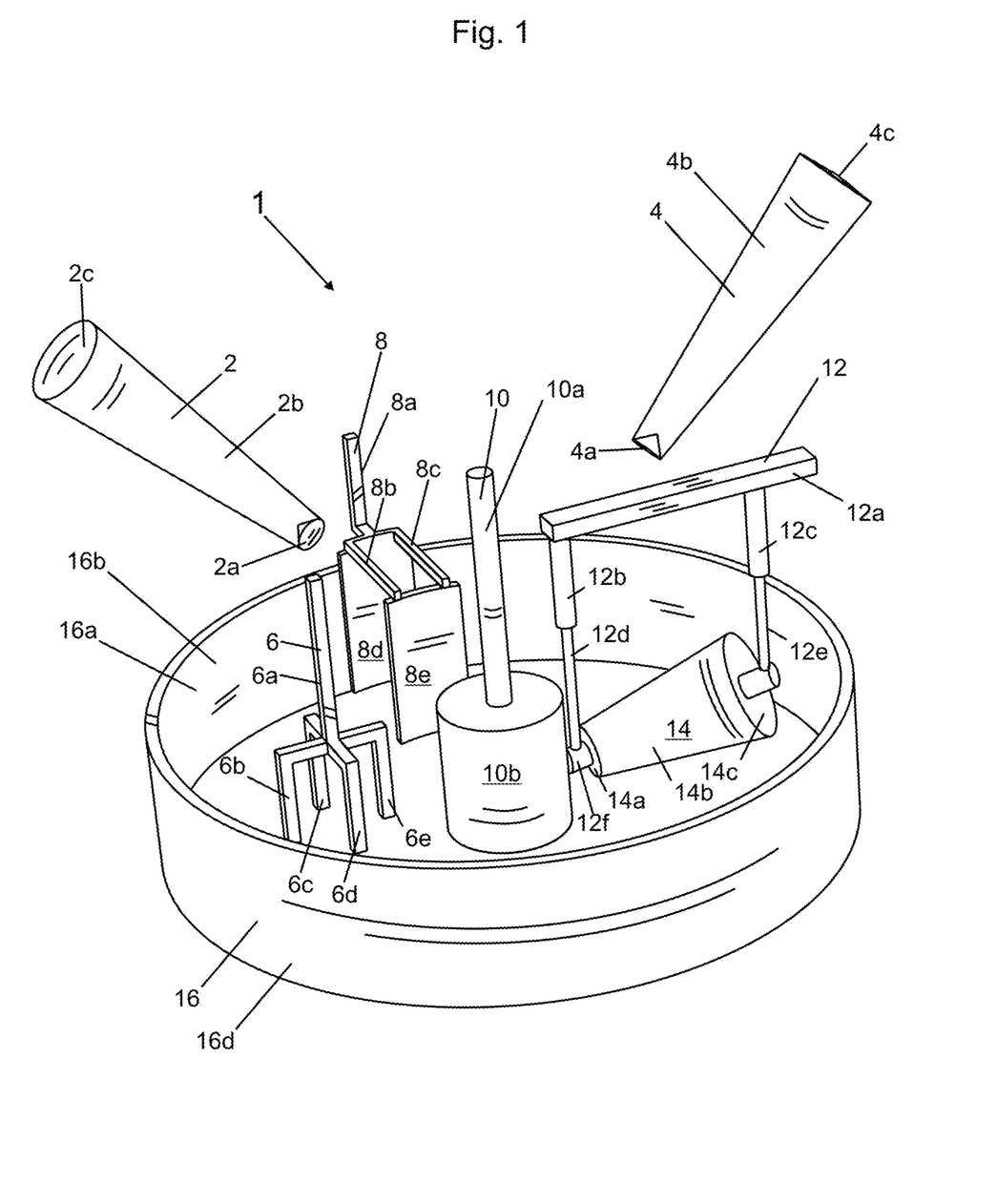
FIG. 1 shows front and top perspective view of an apparatus for use in accordance with an embodiment of the present invention.

FIG. 1 shows perspective view of an apparatus 1 for use in accordance with an embodiment of the present invention. The apparatus 1 includes delivery devices or channels 2 and 4, stirring device 6, shovel device 8, plug device 10, frame device 12, conical frustum device 14, and blending drum 16.

The delivery device 2 has an opening 2c, a body section 2b, and an opening 2a. The openings 2c and 2a may be circular and the opening 2c may be substantially larger than the opening 2a. Similarly, the delivery device 4 has an opening 4c, a body section 4b, and an opening 4a. The openings 4c and 4a may be circular and the opening 4c may be substantially larger than the opening 4a.

The stirring device 6 may have a main member 6a, and L-shaped members 6b, 6c, 6d, and 6e, which are attached to and/or integrated with main member 6a.

The shovel device 8 may have a main L-shaped member 8a. The members 8b and 8c may be attached and/or integrated with the L-shaped member 8a. The plates 8d and 8e may be fixed and/or integrated with the members 8b and 8c.

The device 10 may have a circular solid cylinder portion 10a, fixed and/or integrated with a cylinder portion 10b. The device 12 acts as a frame for the conical frustum 14 and may have members 12a, 12b, 12c, 12d, 12e, and axle 12f. The conical frustum 14 may be mounted to the axle 12f to allow the conical frustum 14 to rotate around the axle 12f.

Figure 2:
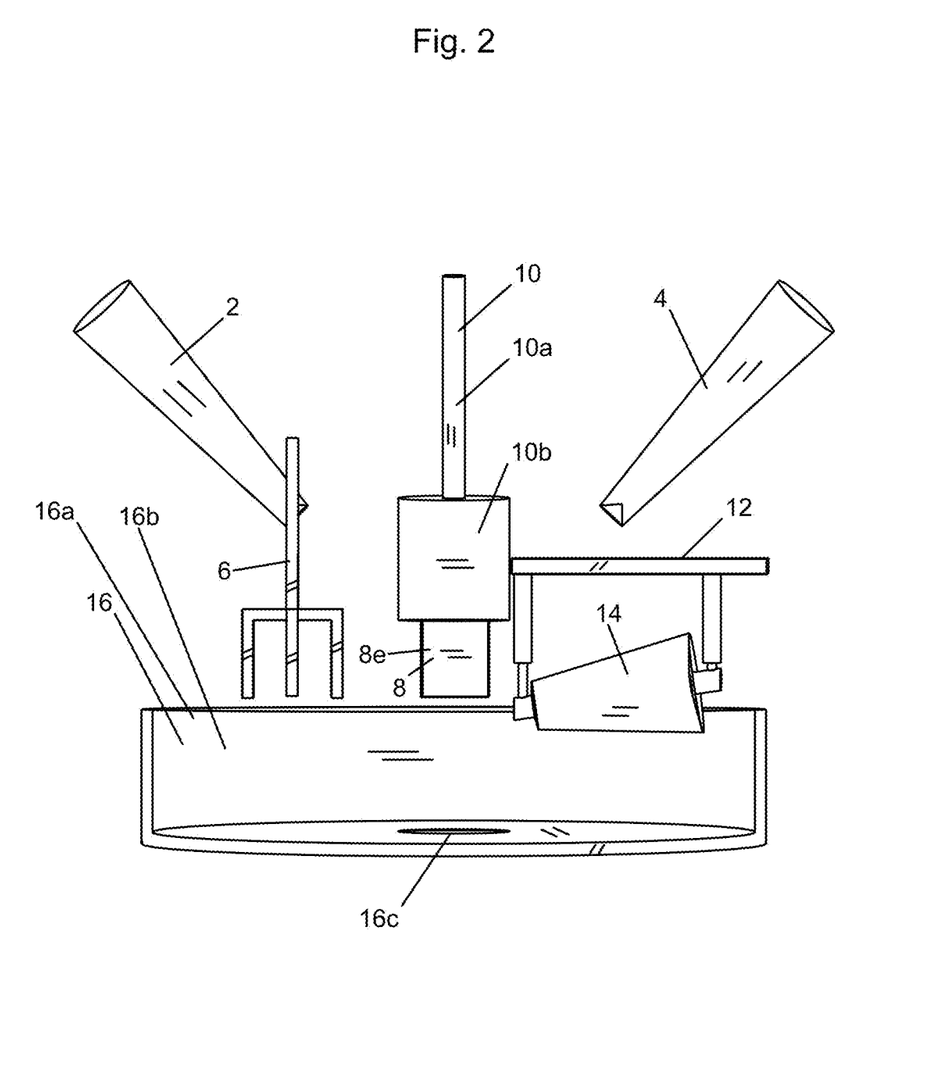
FIG. 2 shows a front view of part of the apparatus of FIG. 1 during a first stage.

FIG. 2 shows a front view of part of the apparatus 1 in FIG. 1 during a first stage. In the first stage or step, composite material has not yet been fed into the blending drum 16 through the opening 16a from the delivery devices 2 and 4. In addition, the devices 6, 8, and 10 are raised above the chamber 16b of the blending drum 16, and the majority of the device or conical frustum 14 is above the chamber 16b of the blending drum 16 FIG. 2 also shows the location of the exit hole 16c.

Figure 3:
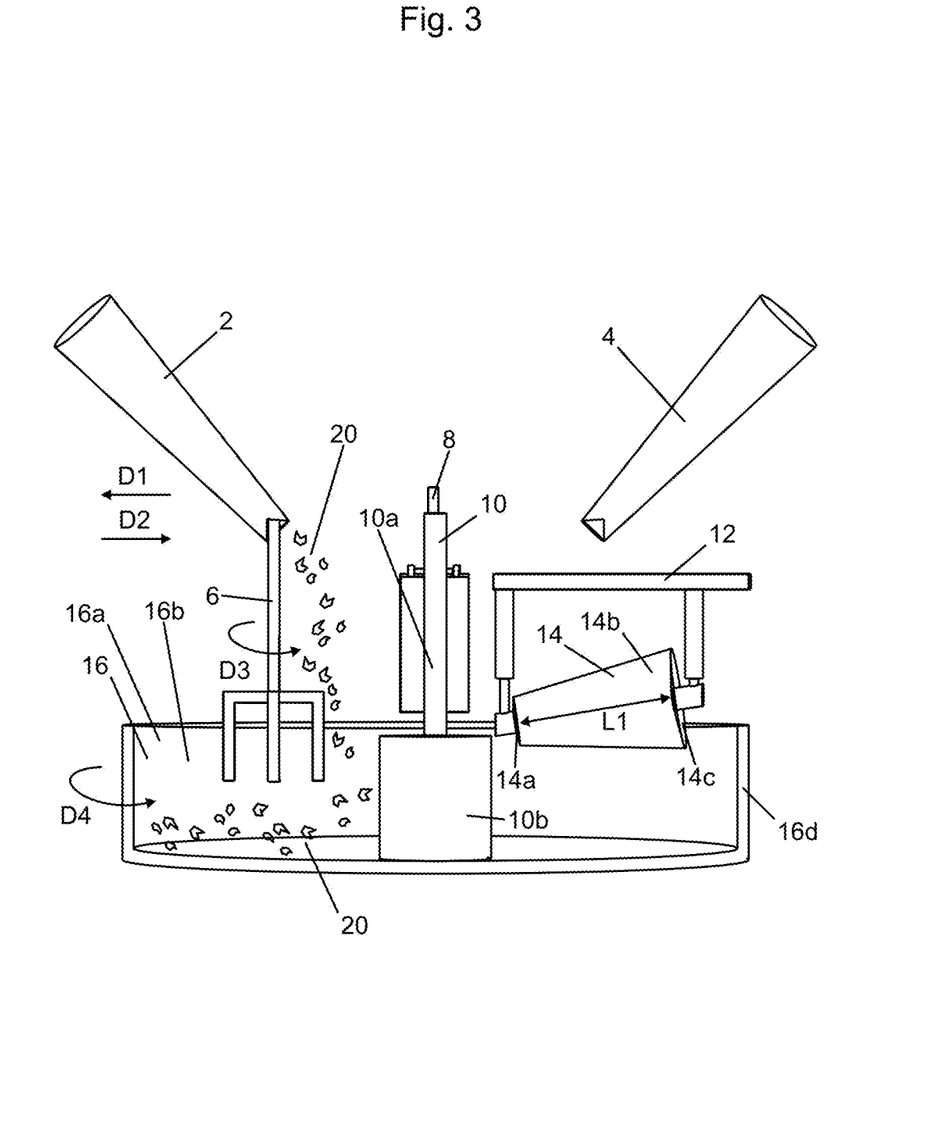
FIG. 3 shows a front view of part of the apparatus of FIG. 1 during a second stage.

FIG. 3 shows a front view of part of the apparatus 1 in FIG. 1 during a second stage. The components shown in FIG. 2 are in the same position in FIG. 3, except as will be described. In the second stage or step shown in FIG. 3, the device 10 has been lowered so that the portion 10b is insider the inner chamber 16b of the blending drum 16, blocking exit hole 16c. In addition the device 6 has been lowered into the inner chamber 16b of the blending drum 16. The device 6 is positioned so that the bottom of members 6b, 6c, 6d and 6e is level with the desired final height of the layer of composite material that is added simultaneously by device 2 and/or 4. The delivery device 2 moves back and forth in directions D1 and D2 along the radius of the blending drum 16 as composite material 20 is being added. Note that composite material 20 may also be added in by delivery device 4, which also would move back and forth in directions D1 and D2. This material from delivery device 4 may be added either simultaneously or after the material from delivery device 2 is deposited. Also, in one or more embodiments, a different composite material 20 is added in by delivery device 2 versus delivery device 4. In addition, the stirring device 6 rotates in the direction D3, and the blending drum 16 rotates in the direction D4. This combined movement allows for an even layer of composite material 20 to be added into blending drum 16, further referred to as layered composite material 20 in FIG. 4. This stage may be repeated multiple times in order to obtain multiple level layers of different composite material 20 in blending drum 16.

Figure 4:
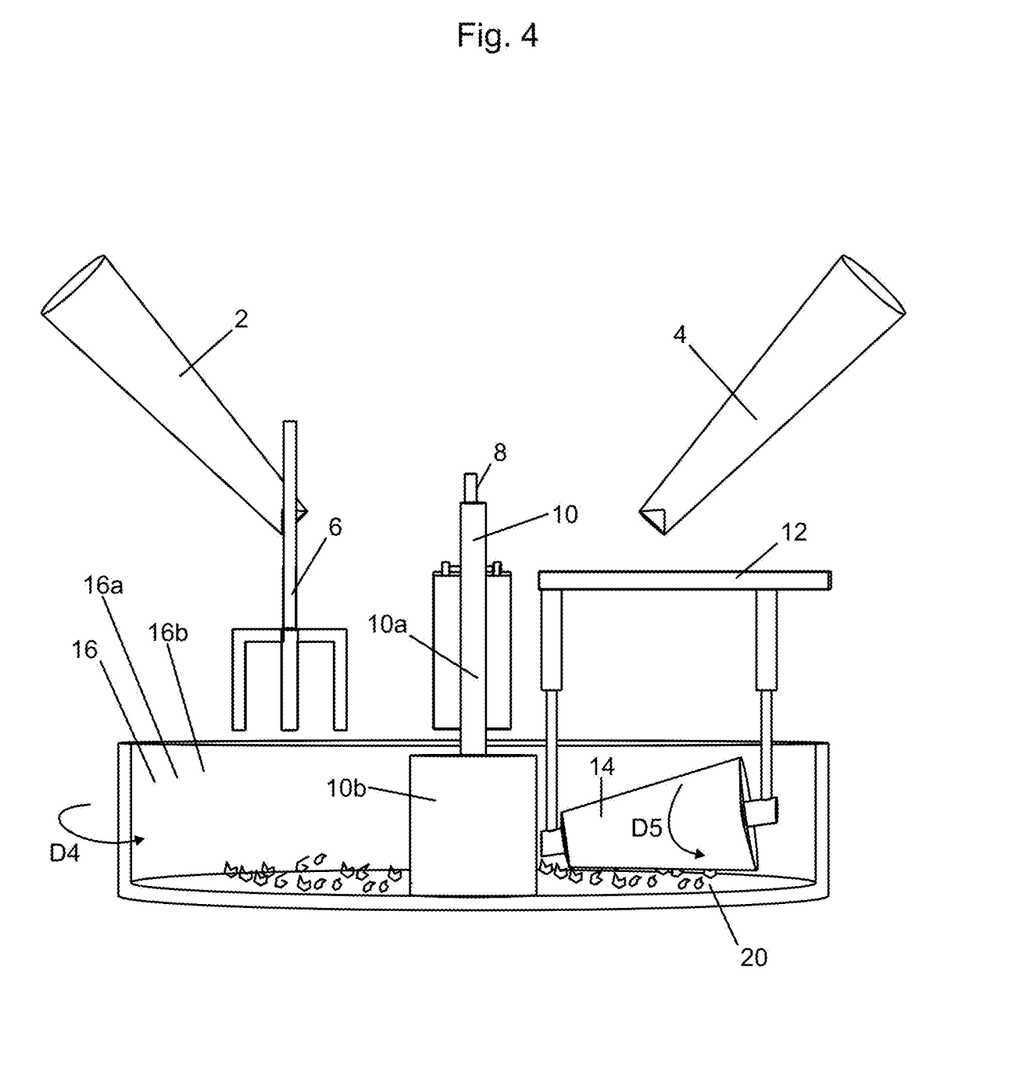
FIG. 4 shows a front view of part of the apparatus of FIG. 1 during a third stage and during a fifth stage.

FIG. 4 shows a front view of part of the apparatus 1 in FIG. 1 during a third stage. The components shown in FIG. 3 are in the same position in FIG. 4, except that in FIG. 4 the layered composite material 20 is present, the device 6 has been raised above the inner chamber 16b, and the frame device 12 has lowered the conical frustum device 14 into the inner chamber 16b. The conical frustum device 14 is driven by a specified pressure in order to compress the different layers of combined composite material 20 to a desired density. The conical frustum device 14 rotates in the direction D5, driven by the blending drum 16s rotation in the direction D4. The motion of devices 14 and 16 occurs until all the composite material 20 has been compressed to the desired density.

Figure 5:
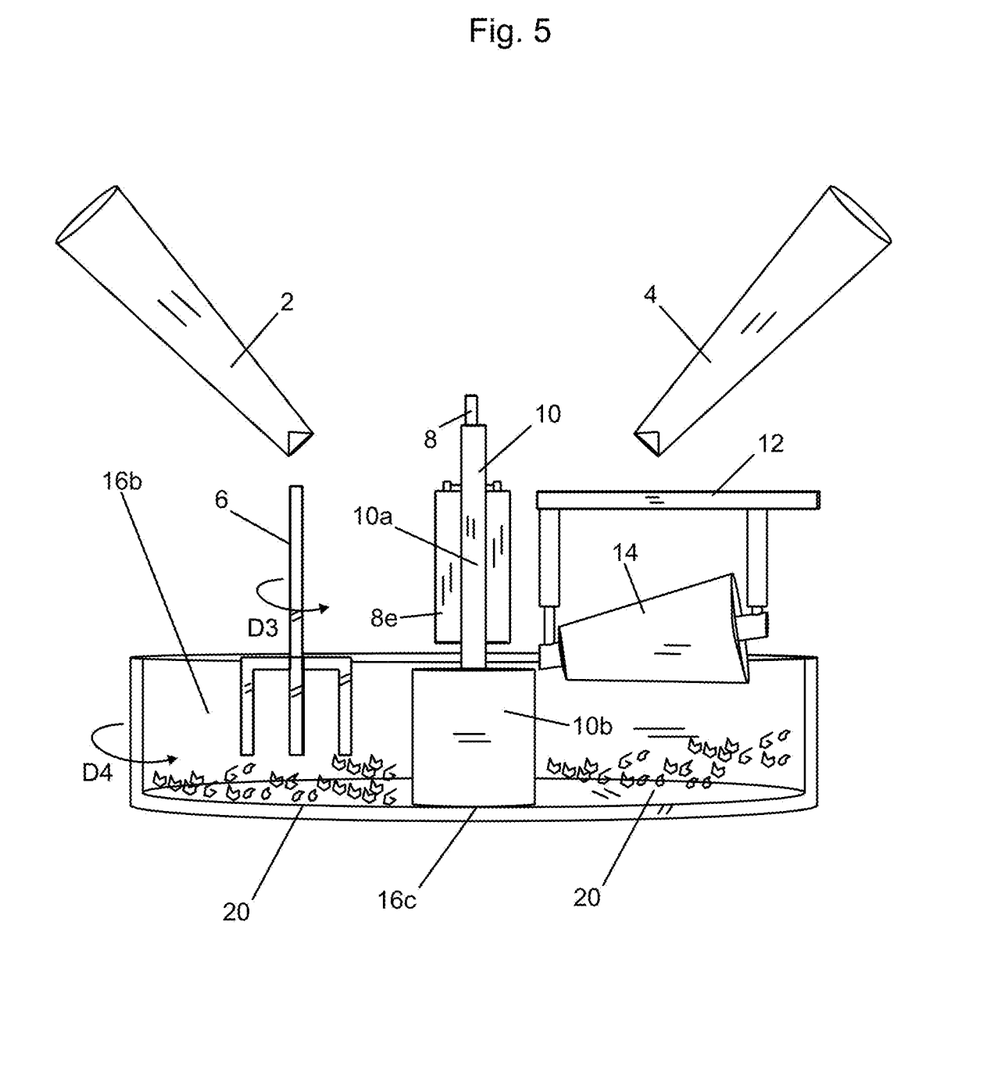
FIG. 5 shows a front cutout view of part of the apparatus of FIG. 1 during a fourth stage.

FIG. 5 shows a front view of part of the apparatus 1 of FIG. 1 during a fourth stage. The components shown in FIG. 4 are in the same position in FIG. 5, except that in FIG. 5 the device 6 is lowered to a specified distance into the multiple layers of compressed composite material 20. The device 6 rotates in direction D3 while the blending drum 16 rotates in direction D4. The rotation of device 6 and blending drum 16 causes the different layers of compressed material 20 to be blended. As device 6 travels through the layered compressed material 20 it breaks up the material into different sized fragments. The size of the fragments can somewhat be controlled based on how fast device 6 and device 16 are rotating. The fragmented material is pushed by device 6 in random directions, causing the orientation of the fragments to change. The majority of fragments contains portions of every layer of composite material. This results in a random marbleized aesthetic similar to natural stone. The rotation of devices 6, 14, and 16 can be controlled by means such as including a computer processor, computer memory, computer display, and computer interactive device, such as a computer mouse and/or keyboard for allowing control of the rotation of devices 6 and 16 by a user and/or computer.

FIG. 4 also shows a front view of part of the apparatus 1 in FIG. 1 during a fifth stage. The components shown in FIG. 5 are in the same position in FIG. 4, except that in FIG. 4 the device 6 has been raised out of the inner chamber 16b, and the device 12 has lowered the conical frustum device 14 into the inner chamber 16b in order to compress the blended layers of composite material 20 to a specific density. This step is similar to the step shown in FIG. 4 except now the blended composite material 20 is being compressed again in order to further develop and maintain the marbleized pattern within the composite material.

Figure 6:
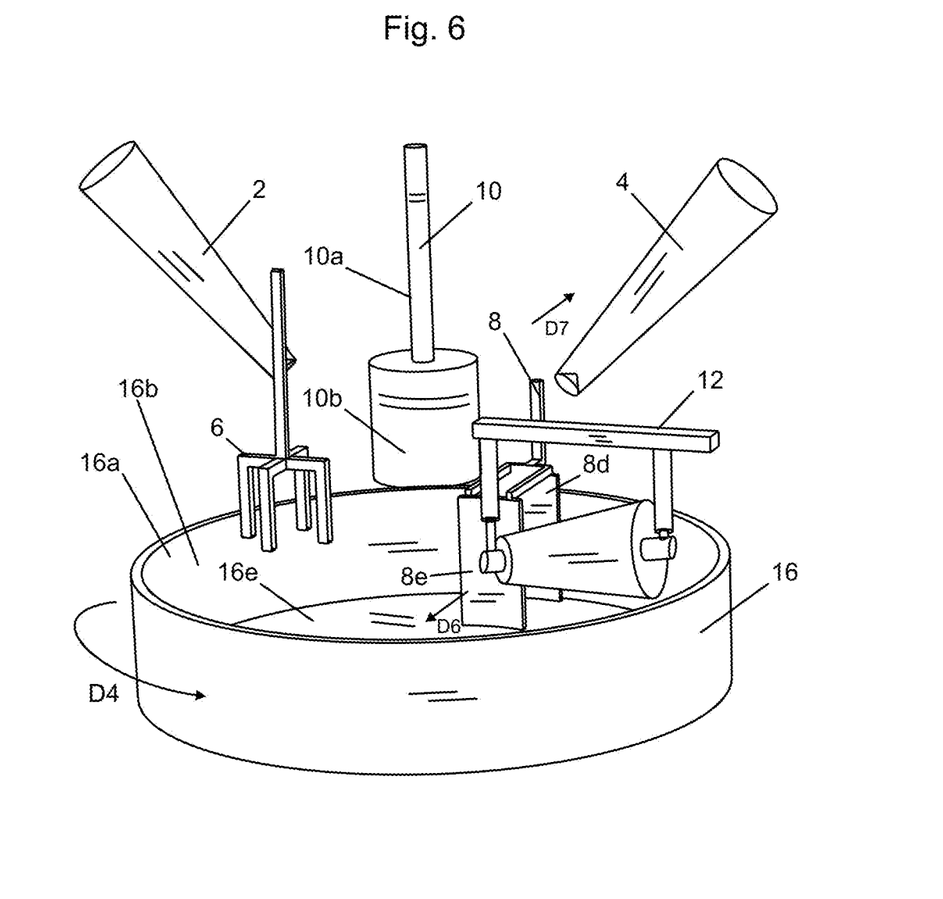
FIG. 6 shows a front view of part of the apparatus of FIG. 1 during a sixth stage.

FIG. 6 shows a perspective view of part of the apparatus 1 of FIG. 1 during a sixth stage. The components shown in FIG. 4 are in the same position in FIG. 6, except that in FIG. 6 frame device 12 has raised the majority of the conical frustum device 14 out of the inner chamber 16b, plug device 10 has raised out of blending drum 16 and shovel device 8 has been lowered so that the bottom of members 8d and 8e are level with the bottom 16e of blending drum 16. Shovel device 8 moves in direction D6 towards exit hole 16c, shown in FIG. 2, in order to push the blended compressed composite material 20 into the exit hole 16c. The shovel device 8 is then raised above the blending drum 16 and moves in direction D7 to return to its original position. This movement is repeated as the blending drum 16 rotates in direction D4 until all the blended compressed composite material 20 (not shown in FIG. 7) has been emptied from blending drum 16 through the exit hole 16c.

Figure 7:
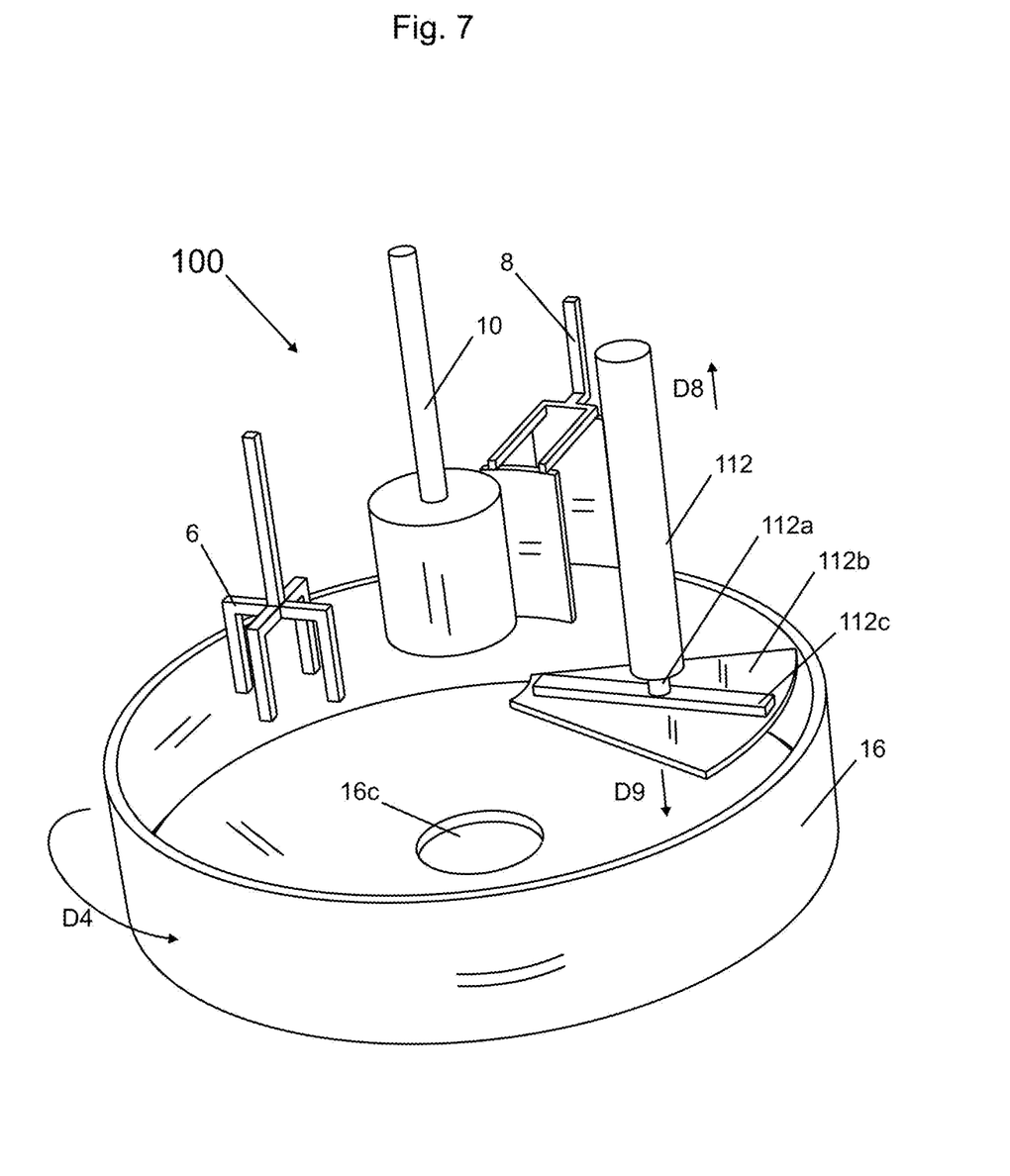
FIG. 7 shows a front and top perspective view of another apparatus with an alternate compression device shown.

FIG. 7 shows a perspective view of an alternate apparatus 100 in which devices 12 and 14 of apparatus 1 of FIG. 1, have been replaced by a power hammer device 112. The device 112 includes a hydraulic cylinder 112a, a compression plate 112b and a support beam 112c. The power hammer device 112 moves up and down in directions D8 and D9 to compress the composite material 18 while blending drum 16 rotates in direction D4. The force with which the plate 112b presses the composite material 20 (not shown in FIG. 7) can be controlled in order to compress the material 20 to a desired density. The means for controlling the pounding force of the power hammer device 112 and/or the power hammer device 112 in general may include a computer processor, computer memory, computer display, and computer interactive device, such as a computer mouse and/or keyboard for allowing control of the power hammer device 112 by a user and/or computer.

Referring to FIGS. 1-7, in operation each of delivery devices or channels 2 and 4 feeds a different type of damp composite material (for material 20) into the inner chamber 16b of the blending drum 16, which can vary based on a number of factors such as particle size or dyes used. The blending drum 16 is typically a cylindrical container with the open top 16a and the exit hole 16c in the center of the bottom 16e (however, exit hole 16c can be located at any point on the bottom 16e). Prior to feeding composite material 20 into the blending drum 16, the device or cylindrical plug portion 10b of device 10 is lowered over the exit hole 16c so no composite material 20 leaks out of the blending drum 16 during the following process. The blending drum 16 rotates in the direction D4 and the channels or delivery devices 2 and/or 4 move along the radius of the blending drum 16 as devices 2 and/or 4 feed material while the multiple pronged stirring device 6 is lowered and rotates in order to spread the composite material 20, resulting in an even layer of material 20 in the blending drum 16. Based on the desired design aesthetic, multiple layers of different or alternating composite material 20 can be added to the blending drum 16 in this fashion from different feeder channels, such as channels or delivery devices 2 and 4.

In at least one embodiment, a conical frustum device 14 is used to compress the layered composite material 20. The conical frustum 14 is aligned such that the surface of the conical frustum 14 or portion 14b is perpendicular to the axis of rotation of the blending drum 16. The inner (of surface 14a) and outer (of surface 14c) diameter of the conical frustum 14 is specified based on each end's distance away from the axis of rotation of the blending drum 16 and the drum's radius. This allows for there to be no slip between the conical frustum and the composite material at any point of contact. In addition, the length, L1 shown in FIG. 3, of the body portion 14b (which is the distance from the surface 14a to the surface 14c) of the conical frustum 14 is set so that the smaller inner end (at surface 14a) of the conical frustum 14 is a set distance away from the center of the blending drum 16 and the outer diameter (at surface 14c) of the conical frustum 14 is a set distance away from the outer wall 16d of the blending drum 16. The pressure that the conical frustum 14 exerts on the composite material 20 can be driven by a variety of mechanisms (hydraulically, mechanically, electrically, etc) and the pressure can be adjusted. The multiple pronged stirring device 6 is then lowered into the inner chamber 16b of the blending drum 16 at a specified distance away from the axis of rotation of the blending drum 16. The stirring device 6 is lowered into the layered composite material 20 and rotates at a specified speed in the direction D3 shown in FIG. 3, while blending drum 16 rotates in the direction D4, order to blend the compressed material 20. The rotational speed of the pronged device 6 determines to what degree the layers of composite material 20 are blended. This action blends the layers of different composite material 20, creating random marbleization. The rotational speed of device 6 and 16 are used to determine the degree and size of marbleization in the final product. In order to maintain this specific marbleized configuration within the composite material, the composite material 20 is compressed again by the conical frustum 14. After this process is complete, the plug 10 or portion 10b is lifted and the compressed marbleized composite material 20 is pushed through the exit hole 16c (shown in FIG. 2) in the center of the blending drum 16 by shovel device 8 and is placed in a mold for further processing.

An alternate embodiment utilizes power hammer device 112 instead of the conical frustum 14 and frame 12. The process of distributing each layer of different composite material 20, compressing the composite material 20, fragmenting and blending the compressed, layered composite material 20 and compressing it again in order to maintain random marbleized pattern within the compressed composite material remains the same.

The apparatus 1 of FIG. 1 and/or the apparatus 100 of FIG. 7 can be used in the following basic overall method. In step one, the composite material 20 can be layered. In step two the layered composite material can be compressed, for example, by conical frustum device 14 or by power hammer device 112. In step three, the device 6 may stir the composite material 20 to break the compressed layered composite material 20 into different size fragments, at the same time these fragments are pushed, changing their orientation. Generally each fragment still contains a portion of each layer of composite material. The orientation of each piece may be randomly changed thereby. Step four may include compressing the fragmented composite material 20 again, such as by conical frustum device 14 or power hammer device 12 to form a marbleized pattern within the composite material 20. The compression steps two and four can be achieved by a variety of mechanisms including but not limited to the conical frustum device 14 or power hammer device 112. The marbleized composite material after the four step process may be sent for further processing to create quartz slabs.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. A method comprising the steps of:
   layering different types of composite material to form a layered composite material of a plurality of layers in an open top compartment, wherein each of the different types of composite material is layered by depositing each of the different types of composite material while being disrupted by at least one member resulting in a layer of composite material of a desired height for each of the different types of composite material of the layered composite material;
   wherein the at least one member causes the desired height of each layer of the plurality of layers of the layered composite material in the open top compartment;
   compressing the layered composite material to form a layered compressed composite material; and
   disrupting the layered compressed composite material so that the layered compressed composite material is broken to form randomly re-oriented composite material fragments.

2. The method of claim 1 further comprising
   compressing the randomly re-oriented composite material fragments after the step of disrupting the layered compressed composite material has ceased.

3. The method of claim 1 wherein
   the different types of composite material are layered in an inner chamber of the open top compartment to form the layered composite material; and
   wherein the layered composite material is compressed in the inner chamber of the open top compartment to form the layered compressed composite material.

4. The method of claim 1 wherein
   at least one of the different types of composite material is a damp particulate composite material.

5. The method of claim 2 wherein
   at least one of the different types of composite material is a damp particulate composite material.

6. The method of claim 3 wherein
   at least one of the different types of composite material is a damp particulate composite material.

7. The method of claim 1 wherein
   each of the different types of composite material are deposited at a top of a container to layer the different types of composite material to form the layered composite material.

8. The method of claim 2 wherein
   each of the different types of composite material are deposited at a top of a container to layer the different types of composite material to form the layered composite material.

9. The method of claim 3 wherein
each of the different types of composite material are deposited at a top of the open top compartment container to layer the different types of composite material to form the layered composite material.

10. The method of claim 4 wherein
each of the different types of composite material are deposited at a top of a container to layer the different types of composite material to form the layered composite material.

11. The method of claim 5 wherein
each of the different types of composite material are deposited at a top of a container to layer the different types of composite material to form the layered composite material.

12. The method of claim 6 wherein
each of the different types of composite material are deposited at a top of the open top compartment to layer the different types of composite material to form the layered composite material.

\* \* \* \* \*